US008849954B2

United States Patent
Kim

(10) Patent No.: US 8,849,954 B2
(45) Date of Patent: Sep. 30, 2014

(54) APPARATUS AND METHOD FOR MANAGING MULTIMEDIA PLAYBACK

(75) Inventor: Sung-geun Kim, Seoul (KR)

(73) Assignee: Samsung Electronics Co, Ltd., Suwon-Si (KR)

( * ) Notice: Subject to any disclaimer, the term of this patent is extended or adjusted under 35 U.S.C. 154(b) by 1779 days.

(21) Appl. No.: 10/964,806

(22) Filed: Oct. 15, 2004

(65) Prior Publication Data

US 2005/0108318 A1 May 19, 2005

(30) Foreign Application Priority Data

Oct. 15, 2003 (KR) ........................ 10-2003-0071853

(51) Int. Cl.
*H04N 9/80* (2006.01)
*G06F 15/16* (2006.01)
*G11B 20/10* (2006.01)

(52) U.S. Cl.
CPC ........ *G11B 20/10* (2013.01); *G11B 2220/2562* (2013.01); *G11B 2020/10972* (2013.01)
USPC .......................................... 709/219; 386/241

(58) Field of Classification Search
USPC .............................................. 709/219; 386/98
See application file for complete search history.

(56) References Cited

U.S. PATENT DOCUMENTS

| | | | | |
|---|---|---|---|---|
| 6,226,446 B1 * | 5/2001 | Murase et al. | ................... | 386/95 |
| 6,934,744 B2 * | 8/2005 | Sogabe et al. | ................ | 709/219 |
| 7,444,353 B1 * | 10/2008 | Chen et al. | ............................ | 1/1 |
| 2001/0016836 A1 * | 8/2001 | Boccon-Gibod et al. | ........ | 705/51 |
| 2002/0126993 A1 * | 9/2002 | Sakuramoto et al. | ........... | 386/77 |
| 2002/0161741 A1 | 10/2002 | Wang et al. | | |
| 2003/0093790 A1 * | 5/2003 | Logan et al. | ..................... | 725/38 |
| 2003/0099457 A1 * | 5/2003 | Takahashi et al. | .............. | 386/46 |
| 2003/0145099 A1 * | 7/2003 | Oka et al. | ....................... | 709/232 |
| 2003/0175016 A1 * | 9/2003 | Mori et al. | ........................ | 386/95 |
| 2005/0015713 A1 * | 1/2005 | Plastina et al. | ............. | 715/500.1 |
| 2005/0018577 A1 * | 1/2005 | Becher et al. | .............. | 369/59.21 |
| 2005/0086696 A1 * | 4/2005 | Daniels | ........................... | 725/88 |
| 2007/0263987 A1 * | 11/2007 | Yahata et al. | ................... | 386/98 |

FOREIGN PATENT DOCUMENTS

| | | |
|---|---|---|
| JP | 2001-250337 | 9/2001 |
| KR | 010035420 | 5/2001 |

* cited by examiner

*Primary Examiner* — Shaq Taha
(74) *Attorney, Agent, or Firm* — Staas & Halsey LLP

(57) ABSTRACT

An apparatus and method of managing reproduction of multimedia contents. A multimedia reproduction method includes: receiving identification information on predetermined multimedia contents; receiving first reproduction information on the predetermined multimedia contents, from a multimedia reproduction management apparatus receiving the transmitted identification information; and if first identification information contained in the received first reproduction information corresponds with the transmitted identification information, reproducing the predetermined multimedia contents based on the first reproduction information. According to the apparatus and method, even when a DVD title being played back is replaced by another DVD title, or when the power of a DVD playback apparatus is suddenly interrupted, the reproduction position information is safely maintained.

23 Claims, 6 Drawing Sheets

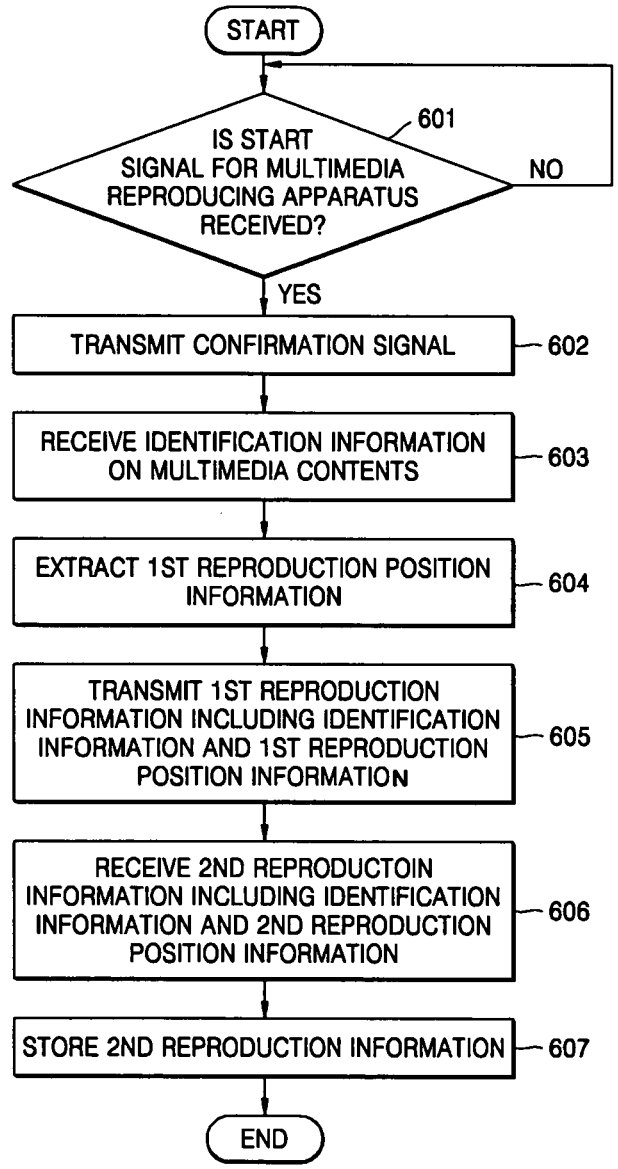

APPARATUS AND METHOD FOR MANAGING MULTIMEDIA PLAYBACK

CROSS-REFERENCE TO RELATED APPLICATIONS

This application claims the priority of Korean Patent Application No. 2003-71853, filed on Oct. 15, 2003 in the Korean Intellectual Property Office, the disclosure of which is incorporated herein in its entirety by reference.

BACKGROUND OF THE INVENTION

1. Field of the Invention

The present invention relates to an apparatus and method of managing reproduction of multimedia contents, and more particularly, to an apparatus and method of managing reproduction of a DVD title.

2. Description of the Related Art

FIG. 1 is a diagram showing a conventional digital video disk (digital versatile disc, DVD) reproducing apparatus and a DVD output apparatus.

Referring to FIG. 1, a DVD reproducing apparatus 11 and a DVD output apparatus 12 are connected to each other through a dedicated line.

The DVD reproducing apparatus 11 reproduces DVD titles (i.e., DVD image and sound signals) stored in the DVD. The DVD output apparatus 12 receives the image and sound signals reproduced in the DVD reproducing apparatus 11 through the dedicated line and outputs the received image and sound signals.

The DVD reproducing apparatus 11 has an embedded memory storing reproduction position information (for example, bookmark information). A user who wants to reproduce a predetermined DVD title, places this DVD title into the DVD reproducing apparatus 11, and if a reproduction button on a control panel or a remote controller of the DVD reproducing apparatus 11 is pushed, this DVD title is reproduced. If the user wants to store a reproduction position, a reproduction position storing button on the control panel or remote controller is pushed and a reproduction position storing command is transmitted. Then, if the DVD reproduction apparatus 11 receives the reproduction position storing command, the reproduction position information is stored in the embedded memory. Thereafter, if it is requested by the user, reproduction of the DVD is performed from the predetermined position of the DVD, by using the reproduction position information stored in the memory.

In the conventional technology described above, the reproduction position information is made to be stored in the memory embedded in the DVD reproducing apparatus 11, but due to the general use of low capacity memories, there are following problems. First, there is a limit in the memory space to store a variety of reproduction position information items. Secondly, reproduction position information cannot be stored for a long enough period. Thirdly, if a DVD title being played back is replaced by another DVD title, the reproduction position information previously stored is deleted.

SUMMARY OF THE INVENTION

In accordance with an aspect of the present invention, an apparatus and method by which even when a DVD title being played back is replaced by another DVD title, or when the power of a DVD playback apparatus is suddenly cut, the reproduction position information is safely kept are provided.

According to an aspect of the present invention, there is provided a multimedia reproducing method including: receiving identification information on predetermined multimedia contents; receiving first reproduction information on the predetermined multimedia contents, from a multimedia reproduction management apparatus receiving the transmitted identification information; and if identification information contained in the received first reproduction information corresponds with the transmitted identification information, reproducing the predetermined multimedia contents based on the first reproduction information.

According to another aspect of the present invention, there is provided a multimedia reproducing apparatus including: a multimedia contents identification information transmission unit which transmits identification information of predetermined multimedia contents; a multimedia contents reproduction information reception unit which receives first reproduction information on the predetermined multimedia contents, from a multimedia reproduction management apparatus receiving the identification information; and a multimedia contents reproduction unit which if identification information contained in the received first reproduction information corresponds with the transmitted identification information, reproduces the predetermined multimedia contents based on the first reproduction information.

According to another aspect of the present invention, there is provided a multimedia reproduction management method including: receiving predetermined identification information from a multimedia reproducing apparatus; extracting first reproduction position information of multimedia contents indicated by the received predetermined identification information; and transmitting first reproduction information, including the predetermined identification information and the extracted first reproduction position information, to the multimedia reproducing apparatus.

According to another aspect of the present invention, there is provided a multimedia reproduction management apparatus including: a multimedia contents identification information reception unit which receives predetermined identification information from a multimedia reproducing apparatus; a multimedia contents reproduction position information extraction unit which extracts first reproduction position information of multimedia contents indicated by the received predetermined identification information; and a multimedia contents reproduction information transmission unit which transmits first reproduction information, including the predetermined identification information and the first reproduction position information, to the multimedia reproducing apparatus.

According to another aspect of the present invention, there is provided a computer readable recording medium having embodied thereon a computer program for the multimedia reproducing method.

According to another aspect of the present invention, there is provided a computer readable recording medium having embodied thereon a computer program for the multimedia reproduction management method.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 6 is a flowchart of the operations performed by a multimedia reproduction management method according to another embodiment of the present invention.

DETAILED DESCRIPTION OF THE EMBODIMENTS

Figure 1:
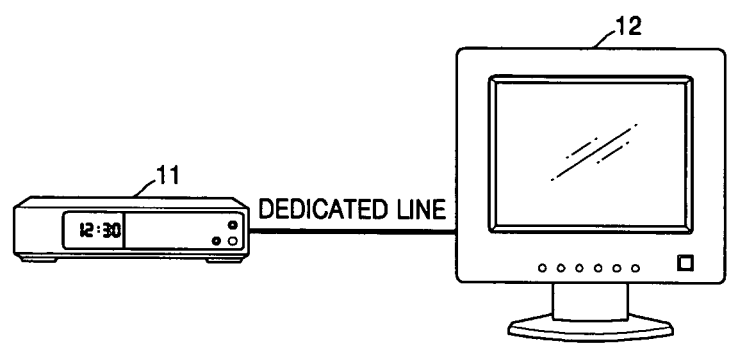
FIG. 1 is a diagram showing a conventional DVD reproducing apparatus and a DVD output apparatus.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
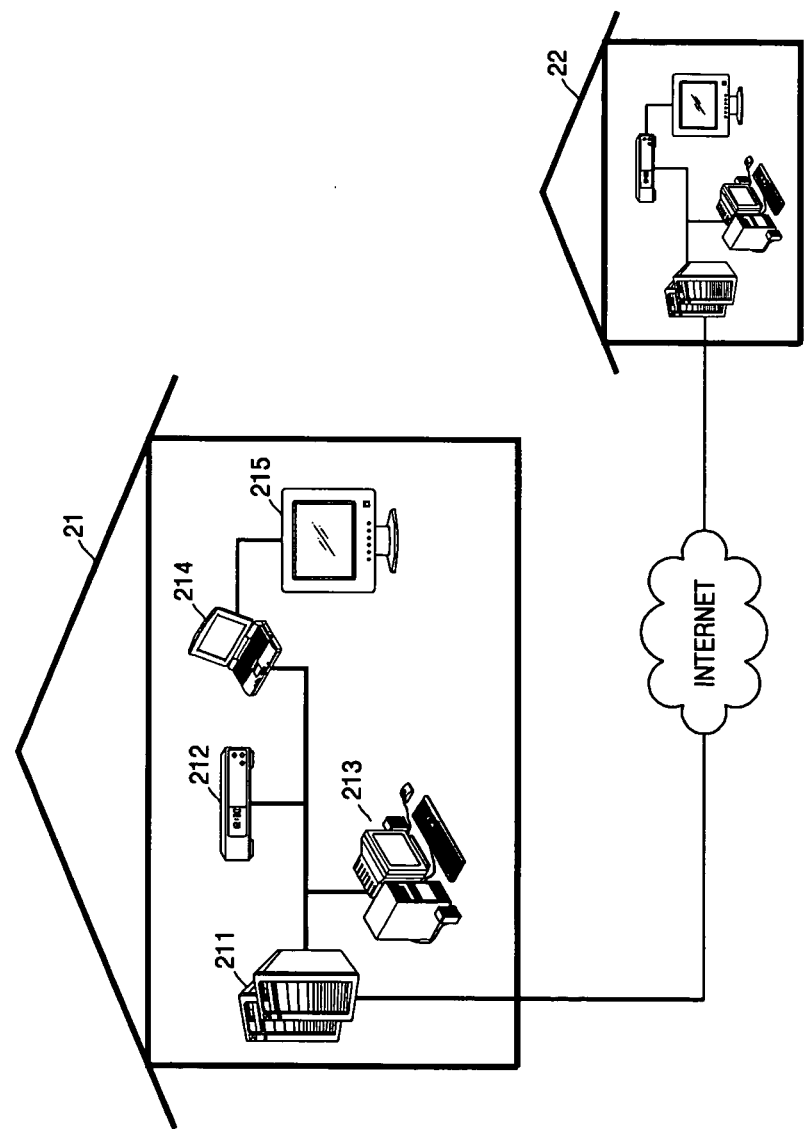
FIG. 2 is a diagram of the structure of a multimedia reproduction/management system according to an embodiment of the present invention.

Referring to FIG. 2, a multimedia reproduction/management system according to an embodiment of the present invention includes a multimedia reproduction management apparatus 211, multimedia reproducing apparatuses 212 through 214, and a multimedia output apparatus 215.

When a user pushes a power button on a control panel or a remote controller of any one of the multimedia reproducing apparatuses 212 through 214, and the corresponding multimedia reproducing apparatus 212 through 214 is started, the corresponding multimedia reproducing apparatus 212 through 214 transmits a start signal for the multimedia reproducing apparatus, to the multimedia reproduction management apparatus 211 through a network. Here, the corresponding multimedia reproducing apparatus 212 through 214 indicates an apparatus capable of reproducing multimedia contents, including DVD titles, such as a DVD reproducing apparatus 212, a desktop PC 213, or a notebook PC 214 installed at home, and the network mainly indicates a home network such as that typically found in a home 21. The network may be wired or wireless.

If the start signal transmitted by any one of the multimedia reproducing apparatuses 212 through 214 is received, the multimedia reproduction management apparatus 211 transmits an acknowledgement signal for the start signal to the corresponding multimedia reproducing apparatus 212 through 214 through the network. As described above, the multimedia reproducing apparatuses 212 through 214 may be installed mainly at home and therefore, the multimedia reproduction management apparatus 211 may also be installed mainly at home. Accordingly, the multimedia reproduction management apparatus 211 may be mounted on an existing home server.

If the acknowledgement signal transmitted by the multimedia reproducing apparatus is received, the corresponding multimedia reproducing apparatus 212 through 214 transmits identification information on multimedia contents from an information storage medium loaded in the corresponding multimedia reproducing apparatus 212 through 214 to the multimedia reproduction management apparatus 211 through the network. If multimedia contents are a DVD title, identification information may be a unique key of the DVD title. This unique key value is generated based on a universal disk format (UDF) property. For example, a unique key value can be generated by combining a video title set identifier (VTS_ID), a video title set number (VTSN), etc. Here, VTS_ID indicates the identification of a DVD title and the VTSN indicates an ordered number assigned to each piece of a DVD title formed with a plurality of pieces. That is, the identification information is information allowing each DVD disc to be distinguished.

The multimedia reproduction management apparatus 211 receives the identification information on the multimedia contents transmitted by the corresponding multimedia reproducing apparatus 212 through 214 through the network, extracts first reproduction position information of the multimedia contents indicated by the received identification information, and transmits first reproduction information including the identification information and the extracted first reproduction position information. As described above, since the multimedia reproduction management apparatus 211 is mounted on the home server, reproduction position information on a variety of multimedia contents can be stored in a large capacity storage (not shown) disposed in the home server or externally to the home server. At this time, in order to indicate the multimedia contents corresponding to reproduction position information, reproduction position information of predetermined multimedia contents are stored together with the identification information of the multimedia contents, forming a pair. Identification information is searched for in the storage disposed in the multimedia reproduction management apparatus 211, and if the search result indicates that the identification information is stored, first reproduction position information paired with this is extracted. The first reproduction position information is reproduction position information recorded previously, and may include time information or frame information, or both. For example, reproduction position information formed with time information and frame information can be hour: minute: second: frame. With this information, the previous reproduction position can be determined accurately.

The corresponding multimedia reproducing apparatus 212 through 214 receives the first reproduction information transmitted by the multimedia reproduction management apparatus 211, through the network. If first identification information included in the received first reproduction information corresponds to the transmitted identification information and the received first reproduction information includes first reproduction position information, then the corresponding multimedia reproducing apparatus 212 through 214 reproduces the multimedia contents from the reproduction position indicated by the first reproduction position information. In the conventional method, if a first DVD title being played back is replaced by a second DVD title, and then, the second DVD title being played back is replaced again by the first DVD title, the previous reproduction position cannot be identified such that a search should be performed from the beginning of the first DVD title. However, according to aspects of the present invention, the previous reproduction position information is extracted from the storage disposed in the multimedia reproduction management apparatus 211, and the extracted reproduction position information is transmitted together with first identification information. Then, the corresponding multimedia reproducing apparatus 212 through 214 receives the reproduction position information and the first identification information from the multimedia reproduction management apparatus 211 through the network and confirms whether or not numbers of the transmitted identification information and the first identification information match. If the confirmation result indicates that the identification numbers match, the received reproduction position information is recognized as the previous reproduction position information of the multimedia contents as currently placed, and reproduction is performed from the reproduction position according to this reproduction position information. By doing so, the inconvenience of the conventional method as described above can be solved.

In addition, since reproduction position information and identification information stored in the storage disposed in the multimedia reproduction management apparatus 211 can be used by the plurality of multimedia reproducing apparatuses 212 through 214, other apparatuses as well as the corresponding apparatus currently reproducing multimedia contents can begin reproduction from the previous reproduction positions.

When reproduction of the multimedia contents being played back is stopped, the corresponding multimedia reproducing apparatus 212 through 214 transmits second reproduction information, including second identification information of the multimedia contents and second reproduction position information of the reproduction stop time, to the multimedia reproduction management apparatus 211 through the network. Of course, the second reproduction position information is information to determine a reproduction position when the multimedia contents are reproduced next time.

The multimedia reproduction management apparatus 211 receives the second reproduction information transmitted by the corresponding multimedia reproducing apparatus 212 through 214 through the network, and stores the received second reproduction information. The second reproduction information will be stored in the storage disposed in the multimedia reproduction management apparatus 211.

If the second identification information from the corresponding multimedia reproducing apparatus 212 through 214 is received, the multimedia reproduction management apparatus 211 searches the storage with this second identification information, extracts the second reproduction position information paired with this second identification information, and transmits the second reproduction position information to the corresponding multimedia reproducing apparatus 212 through 214 through the network.

Additionally, multimedia contents may be exchanged between the multimedia reproduction management apparatus 211 at the home 21 with another multimedia reproduction management apparatus at a remote location 22 via a network such as the Internet.

Figure 3:
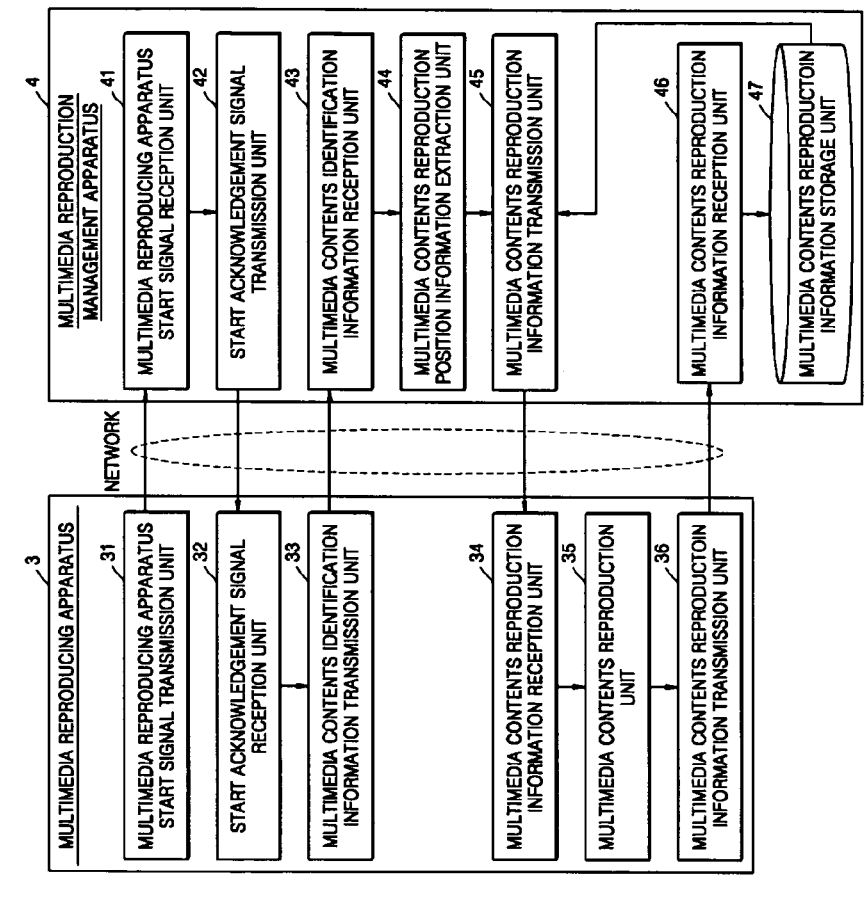
FIG. 3 is a diagram of the structure of the multimedia reproducing apparatus and the multimedia reproduction management apparatus shown in FIG. 2.

FIG. 3 is a diagram of the structure of a multimedia reproducing apparatus and a multimedia reproduction management apparatus shown in FIG. 2. Referring to FIG. 3, the multimedia reproducing apparatus 3 includes a multimedia reproducing apparatus start signal transmission unit 31, a start acknowledgement signal reception unit 32, a multimedia contents identification information transmission unit 33, a multimedia contents reproduction information reception unit 34, a multimedia contents reproduction unit 35, and a multimedia contents reproduction information transmission unit 36.

When the multimedia reproducing apparatus 3 is started, the multimedia reproducing apparatus start signal transmission unit 31 transmits a start signal of the multimedia reproducing apparatus 3, to the multimedia reproducing management apparatus 4 through the network. The start acknowledgement signal reception unit 32 receives an acknowledgement signal for the start signal through the network from the multimedia reproduction management apparatus 4, which receives the start signal transmitted by the reproducing apparatus start signal transmission unit 31. If the acknowledgement signal is received by the start acknowledgement signal reception unit 32, the multimedia contents identification information transmission unit 33 transmits identification information for multimedia contents through the network to the multimedia reproduction management apparatus 4. The multimedia contents reproduction information reception unit 34 receives first reproduction information for the multimedia contents from the multimedia reproduction management apparatus 4, which receives the identification information transmitted by the multimedia contents identification information transmission unit 34.

If first identification information included in the first reproduction information received by the multimedia contents reproduction information reception unit 34 corresponds with the transmitted identification information and first reproduction position information is included in the received first reproduction information, the multimedia contents reproduction unit 35 reproduces the multimedia contents at the reproduction position indicated by the first reproduction position information. If any reproduction position information on the multimedia contents is not included in the received first reproduction information, the multimedia contents are reproduced from a reproduction start position of the multimedia contents. The case that reproduction position information is not included indicates that the multimedia contents have never been reproduced, or have been reproduced to the end. Accordingly, in this case, the multimedia contents are reproduced from the beginning.

When reproduction of the multimedia contents being played back in the multimedia contents reproduction unit 35 is stopped, the multimedia contents reproduction information transmission unit 36 transmits second reproduction information, including the identification number and second reproduction position information of the reproduction stop time, to the multimedia reproduction management apparatus 4 through the network. If reproduction is performed for some time by the multimedia contents reproduction unit 35, the reproduction position changes. Accordingly, if the reproduction is stopped, the second reproduction information, including the second reproduction position information of the stop time, is transmitted to the multimedia reproduction management apparatus 4 through the network, and the multimedia reproduction management apparatus 4 receives and stores the second reproduction information in the multimedia contents reproduction information storage unit 47.

Meanwhile, the multimedia contents reproduction information transmission unit 36 can periodically transmit third reproduction information, including identification information on multimedia contents and third reproduction position information of a reproduction time, on the multimedia contents currently being played back in the multimedia contents reproduction unit 35. Thus, reproduction position information stored in the storage disposed in the multimedia reproduction management apparatus 4 is periodically updated. This is to update the reproduction position information in advance in order to prepare for a case where the reproduction in the multimedia reproducing apparatus 3 is stopped by an unknown cause such as a sudden power cut-off.

Referring to FIG. 3, the multimedia reproduction management apparatus 4 includes a multimedia reproducing apparatus start signal reception unit 41, a start acknowledgement signal transmission unit 42, a multimedia contents identification information reception unit 43, a multimedia contents reproduction position information extraction unit 44, a multimedia contents reproduction information transmission unit 45, a multimedia contents reproduction information reception unit 46, and a multimedia contents reproduction information storage unit 47.

The multimedia reproducing apparatus start signal reception unit 41 receives a start signal from the multimedia reproducing apparatus 3 through the network. If the start signal is received by the multimedia reproducing apparatus start signal reception unit 41, the start acknowledgement signal transmission unit 42 transmits an acknowledgement signal for the start signal, to the multimedia reproducing apparatus 3. The multimedia contents identification information reception unit 43 receives identification information on multimedia contents through the network from the multimedia reproducing apparatus 3, which receives the acknowledgement signal transmitted by the start acknowledgement signal transmission unit 42.

The multimedia contents reproduction position information extraction unit 44 extracts first reproduction position information of multimedia contents indicated by the identification information received by the multimedia contents identification information reception unit 43. The multimedia contents reproduction position information extraction unit 44 searches the multimedia reproduction information storage unit 47 for the identification information, and if the identification information is stored in the multimedia reproduction information storage unit 47, extracts first reproduction position information of the multimedia contents indicated by the identification information from the multimedia reproduction information storage unit 47. Here, the multimedia reproduction information storage unit 47 is a storage disposed in the multimedia reproduction management apparatus 4. It is understood that the storage may be located externally to the multimedia reproduction management apparatus 4.

The multimedia contents reproduction information transmission unit 45 transmits the first reproduction information, including first identification information, and the first reproduction position information extracted by the multimedia contents reproduction position information extraction unit 44, to the multimedia reproducing apparatus 3 through the network. The multimedia contents reproduction information reception unit 46 receives second reproduction information, including second identification information and second reproduction position information of the multimedia contents, through the network from the multimedia reproducing apparatus 3, which receives the first reproduction position information transmitted by the multimedia contents reproduction information transmission unit 45. Here, the first reproduction position information is the previous reproduction position information stored in the multimedia contents reproduction information storage unit 47, and the second reproduction position information is information on a reproduction position changed by the reproduction of the multimedia reproducing apparatus 3. The multimedia contents reproduction information storage unit 47 stores the second reproduction information received by the multimedia contents reproduction information reception unit 46.

Figure 4:
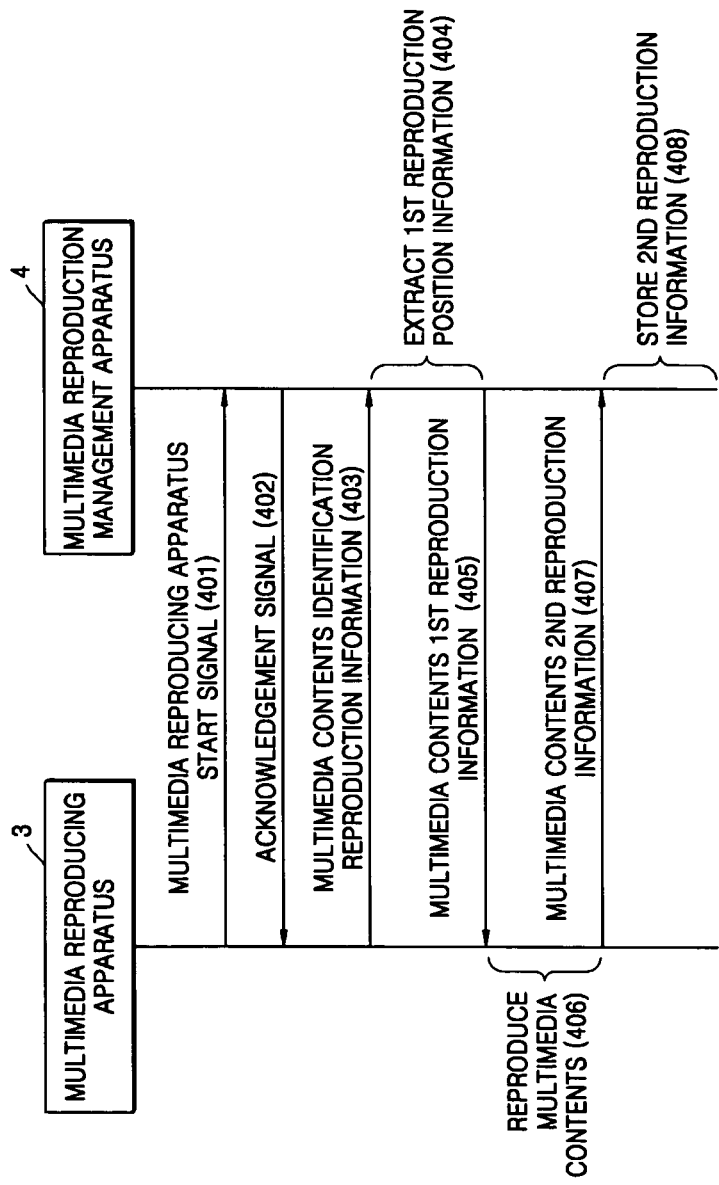
FIG. 4 is a flow diagram of a multimedia reproduction and/or management method according to an embodiment of the present invention.

FIG. 4 is a flow diagram of a multimedia reproduction and/or management method according to an embodiment of the present invention. Referring to FIG. 4, the operations forming the multimedia reproduction and/or management method will now be explained.

When a multimedia reproducing apparatus is started, the start signal of the multimedia reproducing apparatus is transmitted through a network in operation 401. Then, if the transmitted start signal is received, an acknowledgement signal for the start signal is transmitted through the network in operation 402. Next, if the transmitted acknowledgement signal is received, identification information on multimedia contents is transmitted through the network in operation 403. Then, the identification information on the transmitted multimedia contents is received through the network, and if matching identification information is stored, first reproduction position information for the multimedia contents indicated by the stored identification information is extracted in operation 404. Next, first reproduction information, including first identification information and extracted first reproduction position information, is transmitted through the network in operation 405. Next, the transmitted first reproduction information is received, and if the first identification information included in the received first reproduction information corresponds with the identification information transmitted in operation 403, and first reproduction position information is included in the received first reproduction information, the multimedia contents are reproduced from the reproduction position indicated by the first reproduction position information in operation 406. Next, if the reproduction of multimedia contents being played back is stopped, second reproduction information, including identification information of multimedia contents and second reproduction position information of the reproduction stop time, is transmitted through the network in operation 407. Then, the transmitted second reproduction information is received through the network and the received second reproduction information is stored in operation 408.

Figure 5:
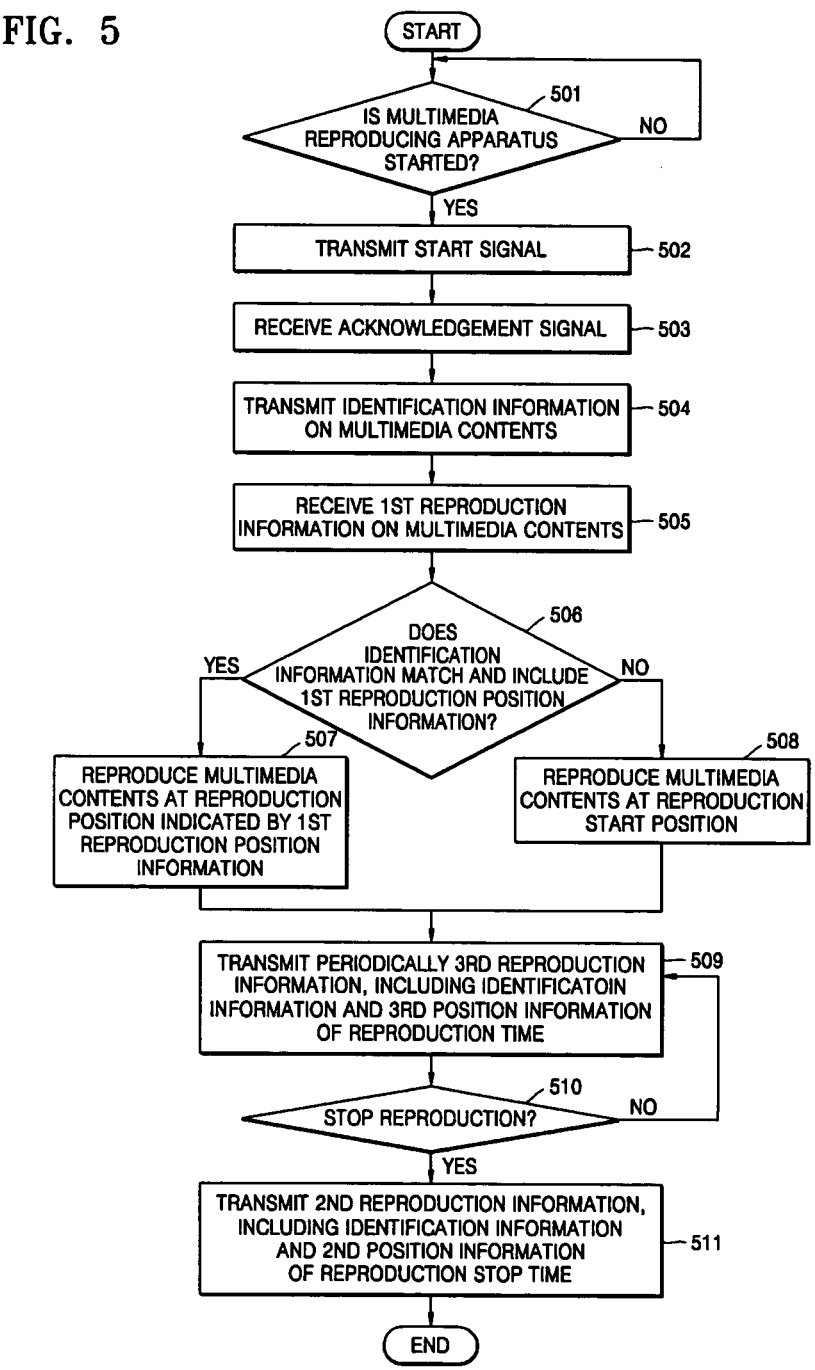
FIG. 5 is a flowchart of the operations performed by a multimedia reproducing method according to an embodiment of the present invention.

FIG. 5 is a flowchart of the operations performed by a multimedia reproducing method according to an embodiment of the present invention. Referring to FIG. 5, the operations forming the multimedia reproducing method will now be explained.

If a multimedia reproducing apparatus is started in operation 501, a start signal of the multimedia reproducing apparatus is transmitted to a multimedia reproduction management apparatus through a network in operation 502. Then, an acknowledgement signal for the start signal from the multimedia reproduction management apparatus, which receives the transmitted start signal, is received through the network in operation 503. Then, if the acknowledgement signal is received, identification information on multimedia contents is transmitted to the multimedia reproduction management apparatus through the network in operation 504. Then, first reproduction information on multimedia contents from the multimedia reproduction management apparatus, which receives the transmitted identification information, is received through the network in operation 505. Then, if first identification information included in the received first reproduction information matches the transmitted identification information, and first reproduction position information is included in the received first reproduction information in operation 506, multimedia contents are reproduced from the reproduction position indicated by the first reproduction position information in operation 507. If reproduction position information is not included in the received first reproduction information in operation 506, the multimedia contents are reproduced from the reproduction start position of the multimedia contents in operation 508. Then, third reproduction information, including third identification information of the multimedia contents currently being played back and third reproduction position information of a reproduction time, is periodically transmitted to the multimedia reproduction management apparatus through the network in operation 509. Then, if the reproduction of multimedia contents being played back is stopped in operation 510, second reproduction information, including second identification information and second reproduction position information corresponding to the reproduction stop time, is transmitted to the multimedia reproduction management apparatus through the network in operation 511.

FIG. 6 is a flowchart of the operations performed by a multimedia reproduction management method according to another embodiment of the present invention. Referring to FIG. 6, the operations forming the multimedia reproduction management method will now be explained.

If a start signal of a multimedia reproducing apparatus from a multimedia reproducing apparatus is received through a network in operation 601, an acknowledgement signal for the start signal is transmitted to the multimedia reproducing apparatus through the network in operation 602. Then, identification information of multimedia contents from the multimedia reproducing apparatus, which receives the transmitted acknowledgement signal, is received through the network in operation 603. Then, if the received identification information is stored, first reproduction position information of multimedia contents indicated by this identification information is extracted in operation 604. Then, first reproduction information, including the identification information and the extracted first reproduction position information, is transmitted to the multimedia reproducing apparatus through the network in operation 605. Then, second reproduction information, including second identification information and second reproduction position information, from the multimedia reproducing apparatus, which receives the first reproduction position information, is received through the network in operation 606. Then, the received second reproduction information is stored in operation 607.

It is understood that the embodiments of the present invention described above can be written as computer programs and can be implemented in general-use digital computers that execute the programs using a computer readable recording medium.

The computer readable recording medium is any data storage device that can store data which can be thereafter read by a computer system. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

According to aspects of the present invention, by storing reproduction position information of multimedia contents such as DVD titles, in an external memory such as a home server memory, the following effects can be achieved. First, a memory space large enough to store various reproduction position information items for a long enough period can be secured, and the cost for a memory storing reproduction position information disposed in a DVD reproducing apparatus can be saved.

Secondly, since reproduction position information is stored in an external memory, even when a DVD title being played back is replaced by another DVD title, or when the power of a DVD playback apparatus is suddenly interrupted, the reproduction position information is safely kept.

Thirdly, since reproduction position information of a predetermined DVD title can be transmitted to another DVD reproducing apparatus, the reproduction position information stored in the DVD reproducing apparatus can be automatically recognized and used such that user convenience is improved.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A multimedia reproducing method, comprising:
transmitting identification information on a predetermined multimedia content to a multimedia management apparatus;
receiving, identification information identifying the predetermined multimedia contents to be reproduced and a first reproduction position information, from the multimedia management apparatus;
determining whether the received identification information corresponds to the transmitted identification information on the predetermined multimedia contents;
reproducing the predetermined multimedia contents based on the determining, from a reproduction position indicated by the first reproduction position information;
wherein the reproduction position the most recently reproduced position among reproduction positions at which the predetermined multimedia contents are reproduced by at least one of multimedia reproducing apparatuses;
transmitting a start signal to the multimedia management apparatus; and
receiving an acknowledgment signal for the start signal from the multimedia management apparatus which receives the start signal and transmitting identification information for the predetermined multimedia content;
wherein when it is determined that the multimedia contents are a DVD title, identification information may be a unique key of the DVD title generated based on a universal disk format (UDF) property by combining a video title set identifier (VTS_ID), a video title set number (VTSN).

2. The method of claim 1, wherein the identification information identifying the predetermined multimedia contents to be reproduced and the first reproduction position information are included in a reproduction information.

3. The method of claim 1, further comprising:
transmitting second reproduction information including the identification information on the predetermined multimedia contents and second reproduction position information indicating a reproduction stop time, to the multimedia management apparatus if reproduction of the multimedia contents is stopped.

4. The method of claim 3, wherein the transmitting the second reproduction information further comprises periodically transmitting third reproduction information, including the identification information on the predetermined multimedia contents being reproduced and third reproduction position information of the reproduction time.

5. A multimedia reproducing apparatus, comprising:
a multimedia contents identification information transmission unit which transmits identification information on predetermined multimedia contents;

a multimedia contents reproduction information reception unit which receives identification information identifying the predetermined multimedia contents to be reproduced and a first reproduction position information, from a multimedia management apparatus which receives the identification information and stores the first reproduction position information; and a multimedia contents reproduction unit which determines whether the received identification information corresponds to the transmitted identification information on the predetermined multimedia contents ~and reproduces the predetermined multimedia contents based on the determination, from a reproduction position indicated by the first reproduction position;

wherein the reproduction position is the most recently reproduced position among reproduction positions at which the predetermined multimedia contents are reproduced by at least one of multimedia reproducing apparatuses;

transmitting a start signal to the multimedia management apparatus; and receiving an acknowledgment signal for the start signal from the multimedia management apparatus which receives the start signal and transmitting identification information for the predetermined multimedia content;

wherein when it is determined that the multimedia contents are a DVD title, identification information may be a unique key of the DVD title generated based on a universal disk format (UDF) property by combining a video title set identifier (VTS_ID), a video title set number (VTSN).

6. The apparatus of claim 5, wherein the identification information identifying the predetermined the multimedia contents to be reproduced and the first reproduction position information are included in reproduction information.

7. The apparatus of claim 5, further comprising:
a multimedia contents reproduction information transmission unit which if reproduction of the predetermined multimedia contents is stopped, transmits second reproduction information including the identification information on the predetermined multimedia contents and second reproduction position information of a reproduction stop time, to the multimedia management apparatus.

8. The apparatus of claim 7, wherein the multimedia contents reproduction information transmission unit periodically transmits third reproduction information, including the identification information on the predetermined multimedia contents being reproduced and third reproduction position information of a reproduction time, to the multimedia management apparatus.

9. A multimedia reproduction management method, comprising:
receiving, predetermined identification information of the multimedia contents from a plurality of multimedia reproducing apparatuses;
extracting, first reproduction position information of the multimedia contents indicated by the received predetermined identification information; and
transmitting, first reproduction information, including (i) the predetermined identification information to identify the multimedia contents and (ii) the extracted first reproduction position information enabling the multimedia contents to be reproduced at a reproduction position included in the reproduction position information, to the multimedia reproducing apparatus;

wherein the reproduction position is the most recently reproduced position among reproduction positions at which the multimedia contents are reproduced by at least one of multimedia reproducing apparatuses;

transmitting a start signal to the multimedia management apparatus; and receiving an acknowledgment signal for the start signal from the multimedia management apparatus which receives the start signal and transmitting identification information for the predetermined multimedia content;

wherein when it is determined that the multimedia contents are a DVD title, identification information may be a unique key of the DVD title generated based on a universal disk format (UDF) property by combining a video title set identifier (VTS_ID), a video title set number (VTSN).

10. The multimedia reproduction management method of claim 9, further comprising:
receiving second reproduction information, including the predetermined identification information and second reproduction position information corresponding to a reproduction stop time, from a first multimedia reproducing apparatus which receives the first reproduction position information; and
storing the received second reproduction information.

11. The multimedia reproduction management method of claim 10, wherein the receiving the predetermined identification information from the multimedia reproducing apparatus, comprises extracting, the first reproduction position information indicated by stored predetermined identification information if the predetermined identification information is stored with the received second reproduction information.

12. A multimedia management apparatus, comprising:
a multimedia reproduction information storage unit a multimedia contents reproduction position information storing unit which stores first reproduction position information;
a multimedia contents identification information reception unit which receives predetermined identification information from multimedia reproducing apparatuses;
a multimedia contents reproduction position information extraction unit which extracts the first reproduction position information of multimedia contents indicated by the predetermined identification information; and
a multimedia contents reproduction information transmission unit which transmits first reproduction information, including the predetermined identification information and the first reproduction position information to identify the multimedia contents to be reproduced, to the multimedia reproducing apparatus;

wherein the first reproduction position information includes a reproduction position which is the most recently reproduced position among reproduction positions at which the predetermined multimedia contents are reproduced by at least one of multimedia reproducing apparatuses;

transmitting a start signal to the multimedia management apparatus; and receiving an acknowledgment signal for the start signal from the multimedia management apparatus which receives the start signal and transmitting identification information for the predetermined multimedia content;

wherein when it is determined that the multimedia contents are a DVD title, identification information may be a unique key of the DVD title generated based on a universal disk format (UDF) property by combining a video title set identifier (VTS_ID), a video title set number (VTSN).

13. The multimedia management apparatus of claim 12, further comprising: a multimedia contents reproduction information reception unit which:
receives second reproduction information, including the predetermined identification information and second reproduction position information which corresponds to a reproduction stop time, from the multimedia reproducing apparatus which receives the extracted reproduction position information; and
wherein the multimedia reproduction information storage unit stores the second reproduction information.

14. The multimedia management apparatus of claim 13, wherein the multimedia contents reproduction position information extraction unit searches the multimedia reproduction information storage unit for the predetermined identification information, and if the predetermined identification information is stored in the multimedia reproduction information storage unit, extracts the first reproduction position information indicated by the stored predetermined identification information from the multimedia reproduction information storage unit.

15. A computer readable non-transitory magnetic or optical recording medium having embodied thereon a computer program for a multimedia reproducing method of claim 1.

16. A computer readable magnetic or optical recording medium having embodied thereon a computer program for a multimedia management method of claim 9.

17. A multimedia reproduction system, comprising:
a plurality of reproducing apparatuses which reproduce contents from an information magnetic or optical recording medium;
and a multimedia management apparatus which stores reproduction position information indicating a location from which the contents are most recently reproduced by at least one of multimedia reproducing apparatuses and manages reproduction of the contents for the plurality of reproducing apparatuses according to the stored reproduction position information and identification information corresponding to the contents and is communicatively coupled with the plurality of reproducing apparatuses, wherein the plurality of reproducing apparatuses periodically transmits the reproduction position information and the identification information during reproduction of the contents to the multimedia management apparatus for storage such that at a later time the at least one reproducing apparatus determines a previous reproduction position according to the stored reproduction position information and identification information,
wherein the stored reproduction position information and identification information are used to identify the multimedia contents to be reproduced;
transmitting a start signal to the multimedia management apparatus; and
receiving an acknowledgment signal for the start signal from the multimedia management apparatus which receives the start signal and transmitting identification information for the predetermined multimedia content;
wherein when it is determined that the multimedia contents are a DVD title, identification information may be a unique key of the DVD title generated based on a universal disk format (UDF) property by combining a video title set identifier (VTS_ID), a video title set number (VTSN).

18. The system of claim 17, wherein the plurality of reproducing apparatuses requests the previous reproduction position by transmitting identification information to the multimedia management apparatus, the identification information corresponding to the previous reproduction position, the multimedia management apparatus searches the stored reproduction position information and identification information for a match to the identification information and transmits the previous reproduction position to the at least one reproducing apparatus when a match is found such that the plurality of reproducing apparatuses begin reproducing from a location on the information storage medium corresponding to the previous reproduction position.

19. The method of claim 2, wherein the reproduction information is shared by the multimedia management apparatus and the plurality of multimedia reproducing apparatuses via a network, and reproduction of the predetermined multimedia contents is remotely controlled by using the reproduction information, by at least one apparatus via the network.

20. The apparatus of claim 6, wherein the reproduction information is shared by the multimedia management apparatus and the plurality of multimedia reproducing devices via a network, and reproduction of the predetermined multimedia contents is remotely controlled by using the reproduction information via the network.

21. The apparatus of claim 12, wherein the reproduction information is shared by the multimedia management apparatus and the plurality of multimedia reproducing apparatuses via a network, and reproduction of the predetermined multimedia contents is remotely controlled by using the reproduction information, by at least one apparatus via the network.

22. The computer readable magnetic or optical recording medium of claim 15, wherein rhea reproduction information comprising the identification information identifying the predetermined multimedia contents to be reproduced and the first reproduction position information is shared by the multimedia management apparatus and the plurality of multimedia reproducing apparatuses via a network, and reproduction of the predetermined multimedia contents is remotely controlled by using the reproduction information, by at least one apparatus via the network.

23. The computer readable magnetic or optical recording medium of claim 16, wherein rhea reproduction information comprising the identification information identifying the predetermined multimedia contents to be reproduced and the first reproduction position information is shared by the multimedia management apparatus and the plurality of multimedia reproducing apparatuses via a network, and reproduction of the predetermined multimedia contents is remotely controlled by using the reproduction information, by at least one apparatus via the network.

* * * * *

UNITED STATES PATENT AND TRADEMARK OFFICE
CERTIFICATE OF CORRECTION

| | | |
|---|---|---|
| PATENT NO. | : 8,849,954 B2 | Page 1 of 1 |
| APPLICATION NO. | : 10/964806 | |
| DATED | : September 30, 2014 | |
| INVENTOR(S) | : Sung-geun Kim | |

It is certified that error appears in the above-identified patent and that said Letters Patent is hereby corrected as shown below:

In the Claims

Column 10, Line 21, In Claim 1, delete "receiving," and insert -- receiving --, therefor.
Column 10, Line 27, In Claim 1, delete "contents;" and insert -- contents; and --, therefor.
Column 10, Line 31, In Claim 1, delete "position" and insert -- position is --, therefor.
Column 11, Line 11, In Claim 5, delete "~and" and insert -- and --, therefor.
Column 11, Line 15, In Claim 5, delete "position;" and insert -- position information; --, therefor.
Column 11, Line 55, In Claim 9, delete "receiving," and insert -- receiving --, therefor.
Column 11, Line 58, In Claim 9, delete "extracting," and insert -- extracting --, therefor.
Column 11, Line 61, In Claim 9, delete "transmitting," and insert -- transmitting --, therefor.
Column 12, Line 31, In Claim 11, delete "extracting," and insert -- extracting --, therefor.
Column 12, Lines 36-38, In Claim 12, after "unit" delete "a multimedia contents reproduction position information storing unit".
Column 12, Line 42, In Claim 12, after "unit" delete "a multimedia contents reproduction position information storing unit".
Column 12, Line 42, In Claim 12, delete "apparatuses;" and insert -- apparatus; --, therefor.
Column 14, Line 41, In Claim 22, delete "rhea" and insert -- a --, therefor.
Column 14, Line 51, In Claim 23, delete "rhea" and insert -- a --, therefor.

Signed and Sealed this
Eighth Day of September, 2015

Michelle K. Lee
*Director of the United States Patent and Trademark Office*